(12) United States Patent
Ranta

(10) Patent No.: US 8,424,420 B2
(45) Date of Patent: Apr. 23, 2013

(54) FASTENER TOOL AND FEEDER ASSEMBLY THEREFOR

(75) Inventor: Michael J. Ranta, Morton, IL (US)

(73) Assignee: Eaton Corporation, Cleveland, OH (US)

( * ) Notice: Subject to any disclaimer, the term of this patent is extended or adjusted under 35 U.S.C. 154(b) by 343 days.

(21) Appl. No.: 12/869,849

(22) Filed: Aug. 27, 2010

(65) Prior Publication Data

US 2012/0048067 A1    Mar. 1, 2012

(51) Int. Cl.
B25B 23/04    (2006.01)

(52) U.S. Cl.
USPC ................................. 81/57.37; 81/430

(58) Field of Classification Search ......... 81/57.37–431, 81/57; 227/113, 119
See application file for complete search history.

(56) References Cited

U.S. PATENT DOCUMENTS

| | | | | |
|---|---|---|---|---|
| 3,266,537 | A | * | 8/1966 | Ulbing .............................. 81/430 |
| 3,929,176 | A | * | 12/1975 | Dixon .............................. 81/430 |
| 4,856,389 | A | | 8/1989 | Weber |
| 5,004,141 | A | | 4/1991 | Young et al. |
| 5,014,876 | A | | 5/1991 | Young et al. |
| 5,031,489 | A | * | 7/1991 | Young et al. ..................... 81/430 |
| 5,098,003 | A | | 3/1992 | Young et al. |
| 5,123,158 | A | | 6/1992 | Dixon |
| 5,234,127 | A | | 8/1993 | Singer et al. |
| 5,480,087 | A | | 1/1996 | Young et al. |
| 5,740,705 | A | | 4/1998 | Graham |
| 5,918,789 | A | * | 7/1999 | Olvera et al. .................. 227/119 |
| 6,070,758 | A | | 6/2000 | Graham |
| 6,341,542 | B1 | | 1/2002 | Ade et al. |
| 6,502,737 | B2 | * | 1/2003 | Akiba ............................ 227/119 |

OTHER PUBLICATIONS

"DC Hand Screwdriver HSE", Weber Screwdriving Systems, Inc., pp. 1-2, Jan. 2008.
"SD-2000 Series Compact Blow-Fed Screw/Nut Driving Heads", Dixon Automatic Tool, Inc., pp. 1-8, 2000.
"TR Series Torque Arms", Assembly Automation Industries, pp. 1-9, Feb. 21, 2009.
"Nascomatic Screwmaster", Nasco Industries, Inc., http://www.nascoindust.com/nascomatic/screwmaster.htm., p. 1, May 20, 2010.

* cited by examiner

*Primary Examiner* — Hadi Shakeri
(74) *Attorney, Agent, or Firm* — Eckert Seamans Cherin & Mellott, LLC; Grant E. Coffield

(57) ABSTRACT

A feeder assembly is provided for a fastener tool, such as a screw driver, structured to install a number of fasteners, such as screws, in a work piece. The screw driver includes a driver assembly having a driver bit. The screws have a predetermined shape. The feeder assembly includes a nose assembly operatively coupled to the driver assembly, and a conduit. The nose assembly receives the screws and retains them in a predetermined orientation below the driver bit. The conduit is coupled to the nose assembly, and includes a passageway. The passageway aligns and delivers the screws to the nose assembly in the predetermined orientation. The passageway has a predetermined shape substantially similar to the predetermined shape of the screws. A fastener tool and an associated method of using the fastener tool are also disclosed.

16 Claims, 5 Drawing Sheets

FASTENER TOOL AND FEEDER ASSEMBLY THEREFOR

BACKGROUND

1. Field

The disclosed concept relates generally to fastener tool and, more particularly, to fastener tools, such as screw drivers. The disclosed concept also relates to feeder assemblies for fastener tools. The disclosed concept further relates to methods of using a fastener tool.

2. Background Information

Fastener tools such as, for example and without limitation, screw drivers, and automatic feeder assemblies for feeding fasteners (e.g., without limitation, screws) thereto, are generally well known.

Typically, the feeder assembly transfers the screws, for example, from a hopper or other suitable container wherein the screws are randomly disposed in bulk, and arranges them into an aligned configuration in a single column for delivery to the screw driver. The screw driver includes a nose assembly having a driver bit. The aligned screws are delivered, one-by-one, to the nose assembly via a hose or track. The screw driver is then employed to drive the screw into a corresponding work piece to perform the desired fastening function. More specifically, the nose assembly receives and holds the screw below the driver bit. Then, when the driver bit is lowered, it engages the screw and the nose assembly opens up to allow the screw to engage and be driven into the work piece.

Before the fasteners are sent through the hose or track, they must be oriented so that they will travel in the correct orientation. For example, they must not be delivered to the nose assembly upside down. Some automatic feeder assemblies rely on gravity and/or vibration to suitably arrange and deliver the fasteners to the fastener tool. Others employ an air source to facilitate movement of the fasteners through the hose. Among other disadvantages, known feeder assemblies are generally limited to use with only a select type and/or shape of fastener. For example, fasteners having a head diameter that is equal to or less than the height of the fastener, can tumble within the deliver hose and enter the nose assembly in any direction. Additionally, the screw driver generally has to be employed in a vertical position or the fastener can potentially fall out of the nose assembly.

There is, therefore, room for improvement in fastener tools, in feeder assemblies therefor, and in methods of using such fastener tools.

SUMMARY

These needs and others are met by embodiments of the disclosed concept, which are directed to a feeder assembly and method for fastener tools, such as screw drivers. Among other benefits, the feeder assembly is capable of automatically and consistently feeding a wide variety of different fastener types and shapes to the fastener tool in a predetermined orientation, regardless of the orientation in which the fastener tool is disposed.

As one aspect of the disclosed concept, a feeder assembly is provided for a fastener tool. The fastener tool is structured to install a number of fasteners in a work piece, and includes a driver assembly having a driver bit. The fasteners have a predetermined shape. The feeder assembly comprises: a nose assembly structured to be operatively coupled to the driver assembly, the nose assembly being structured to receive the fasteners and retain the fasteners in a predetermined orientation below the driver bit; and a conduit coupled to the nose assembly, the conduit including a passageway structured to align and deliver the fasteners to the nose assembly in the predetermined orientation.

The passageway of the conduit may have a predetermined shape, wherein the predetermined shape of the passageway may be structured to be substantially similar to the predetermined shape of the fasteners. The nose assembly may comprise a jaw assembly, an adapter, and a biasing element, wherein the adapter is structured to couple the jaw assembly to the driver assembly, wherein the jaw assembly is structured to move between an open position corresponding to the fastener tool being actuated to install a corresponding one of the fasteners in the work piece, and a closed position corresponding to the jaw assembly retaining a corresponding one of the fasteners in the predetermined orientation prior to the fastener tool being actuated, and wherein the biasing element biases the jaw assembly toward the closed position.

The jaw assembly may comprise a jaw body, a first jaw pivotably coupled to the jaw body, and a second jaw pivotably coupled to the jaw body opposite the first jaw. When the jaw assembly moves toward the open position, the first jaw and the second jaw may pivot outwardly away from each other. When the jaw assembly moves toward the closed position, the first jaw and the second jaw may be structured to move toward each other to secure the corresponding one of the fasteners therebetween. The nose assembly may further comprise a collar, a tube, and a washer, and the biasing element may be a spring. The washer may be structured to cooperate with the first jaw and the second jaw, and the spring may be disposed between the washer and the tube. The tube may be at least partially disposed within the jaw body, and the collar may couple the tube to the jaw body. The first jaw may have a first end and a second end. The conduit may be a hose, wherein the hose attaches to the first jaw at or about the first end of the first jaw. The first end of the first jaw may have an internal shape that is substantially the same as the predetermined shape of the hose. At least a portion of the first jaw may be structured to be magnetic.

A fastener tool employing the aforementioned feeder assembly and an associated method of using the fastener tool are also disclosed.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
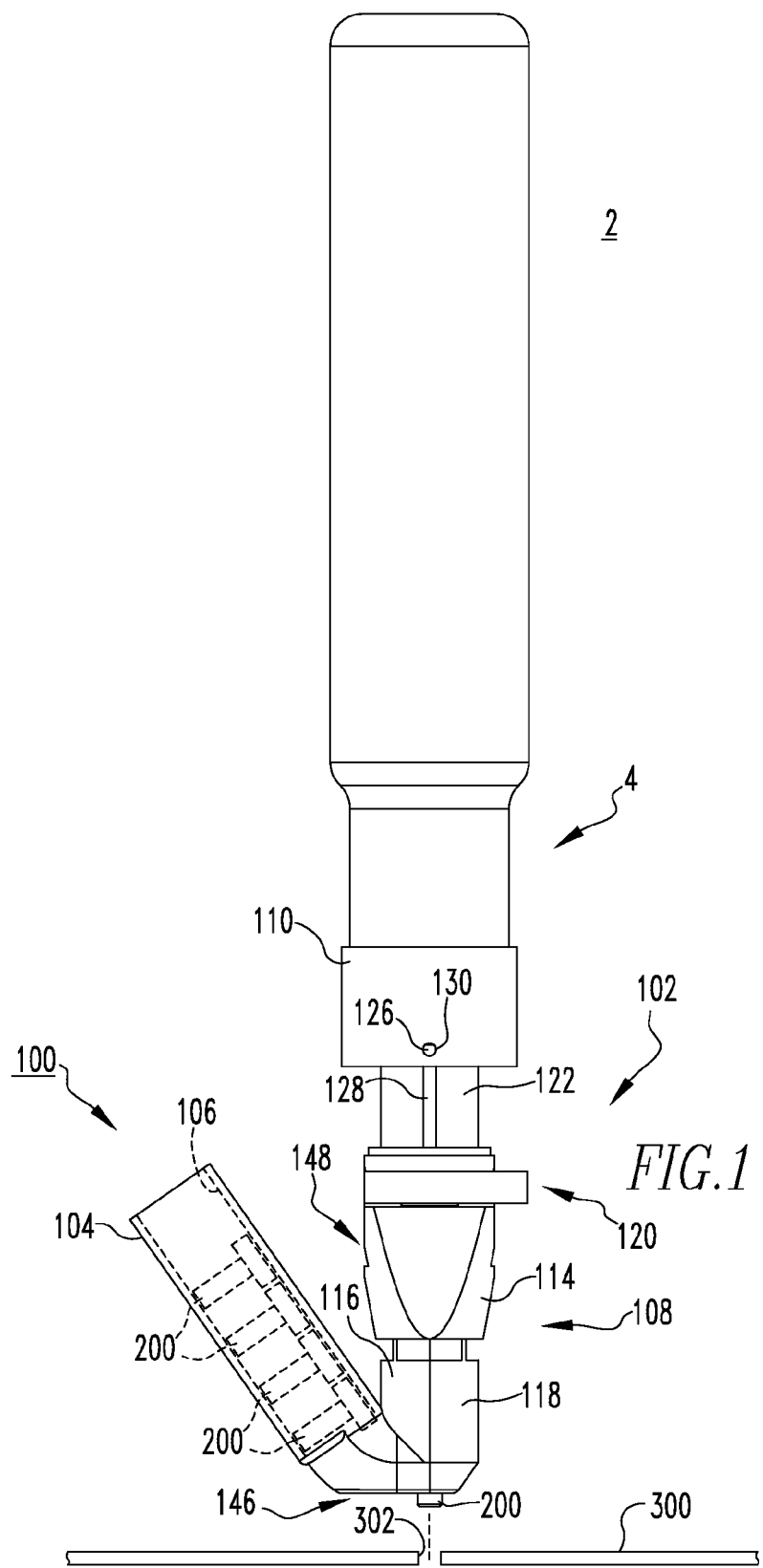
FIG. 1 is a side elevation view of a fastener tool and feeder assembly therefor, in accordance with an embodiment of the disclosed concept.

For purposes of illustration, embodiments of the disclosed concept will be described as applied to feeder assemblies for automatically feeding screws to a portable hand held screw driver and installing the screws in any known or suitable work piece (e.g., without limitation, any known or suitable number, type and/or configuration of material(s) or component(s) to be fastened together), although it will be appreciated that they could also be applied to deliver and fasten any known or suitable fastener (e.g., without limitation, rivets; bolts; nails; pins) other than screws to any known or suitable fastening tool (e.g., without limitation, wrench; nail gun) other than a screw driver.

Directional phrases used herein, such as, for example, up, down, top, bottom and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, rivets, screws, bolts, nails and pins.

As employed herein, the statement that two or more parts are "coupled" together shall mean that the parts are joined together either directly or joined through one or more intermediate parts.

As employed herein, the term "number" shall mean one or an integer greater than one (i.e., a plurality).

FIG. 1 shows a feeder assembly 100 for a fastener tool, such as a driver 2. The fastener tool 2 is structured to install a number of fasteners such as, for example and without limitation, screws 200 (shown in hidden line drawing) into a work piece 300 (partially shown). The fastener tool 2 includes a driver assembly 4 having a driver bit 6 (best shown in the exploded view of FIG. 2).

Continuing to refer to FIG. 1, and also to FIGS. 2-5, the feeder assembly 100 includes a nose assembly 102, which is operatively coupled to the driver assembly 4 of the fastener tool 2, and is structured to receive the aforementioned fasteners 200, one at a time, and retain them in a predetermined orientation below the driver bit 6 (FIGS. 2-5). A conduit 104, which is partially shown herein for simplicity of illustration and economy of disclosure, is coupled to the nose assembly 102. The conduit 104, which for example and without limitation may be a hose, includes a passageway 106 (shown in hidden line drawing in FIG. 1) structured to align and deliver the fasteners 200 to the nose assembly 102 in the desired predetermined orientation. See, for example, fasteners 200 aligned and being fed, one-by-one, in FIG. 1. More specifically, the passageway 106 of the conduit 104 has a predetermined shape (best shown in FIG. 3 and in the sectional views of FIGS. 4 and 5), which is substantially similar to the predetermined shape of the fasteners 200.

It will, therefore, be appreciated that the disclosed fastener tool 2 and feeder assembly 100 therefor can be relatively quickly and easily adapted for use to install a wide variety of different fastener types, sizes and/or shapes, for example, by employing a different conduit (e.g., 104) and/or nose assembly (e.g., 102). That is, the conduit 104 (e.g., without limitation, hose) could be extruded or otherwise formed to provide the passageway (e.g., 106) thereof with any desired predetermined shape corresponding to the predetermined shape of the fasteners (e.g., 200) being employed. It will further be appreciated that the disclosed feeder assembly 100 overcomes the disadvantages known to be associated with prior art feeder assembly and fastener tool designs such as, for example and without limitation, limited use to only a certain size, shape and/or type of fastener, and limitations on the orientation in which the fastener tool had to be employed to avoid fasteners undesirably falling out, or away from, the fastener tool. More specifically, the disclosed feeder assembly 100 and fastener tool 2 can be employed with fasteners (e.g., 200) having any known or suitable size or shape, including, but not limited to, fasteners wherein the diameter of the fastener head 202 (FIGS. 2, 4 and 5) is equal to or greater than the height 204 (FIG. 2) of the fastener 200. Such fasteners could not be readily employed with prior art feeder assemblies and fastener tools (not shown) because they had a tendency to undesirably move (e.g., without limitation, slip; turn; tumble) and be delivered to the fastener tool in the wrong orientation. The disclosed feeder assembly 100 and, in particular, the unique structure of the conduit passageway 106 and nose assembly 102, overcome these disadvantages by consistently aligning fasteners (e.g., 200) in a desired predetermined orientation and ensuring that they are delivered to the fastener tool 2 in such predetermined orientation. Furthermore, once each fastener (e.g., 200) have been delivered to the nose assembly 102, below the driver bit 6, the nose assembly 102 is uniquely structured to retain the fastener 200 in the predetermined orientation. This enables the fastener tool 2 to be employed in any orientation (e.g., without limitation, sideways; upside down), whereas prior art designs (not shown) typically had to be employed in a substantially vertical orientation.

Figure 2:
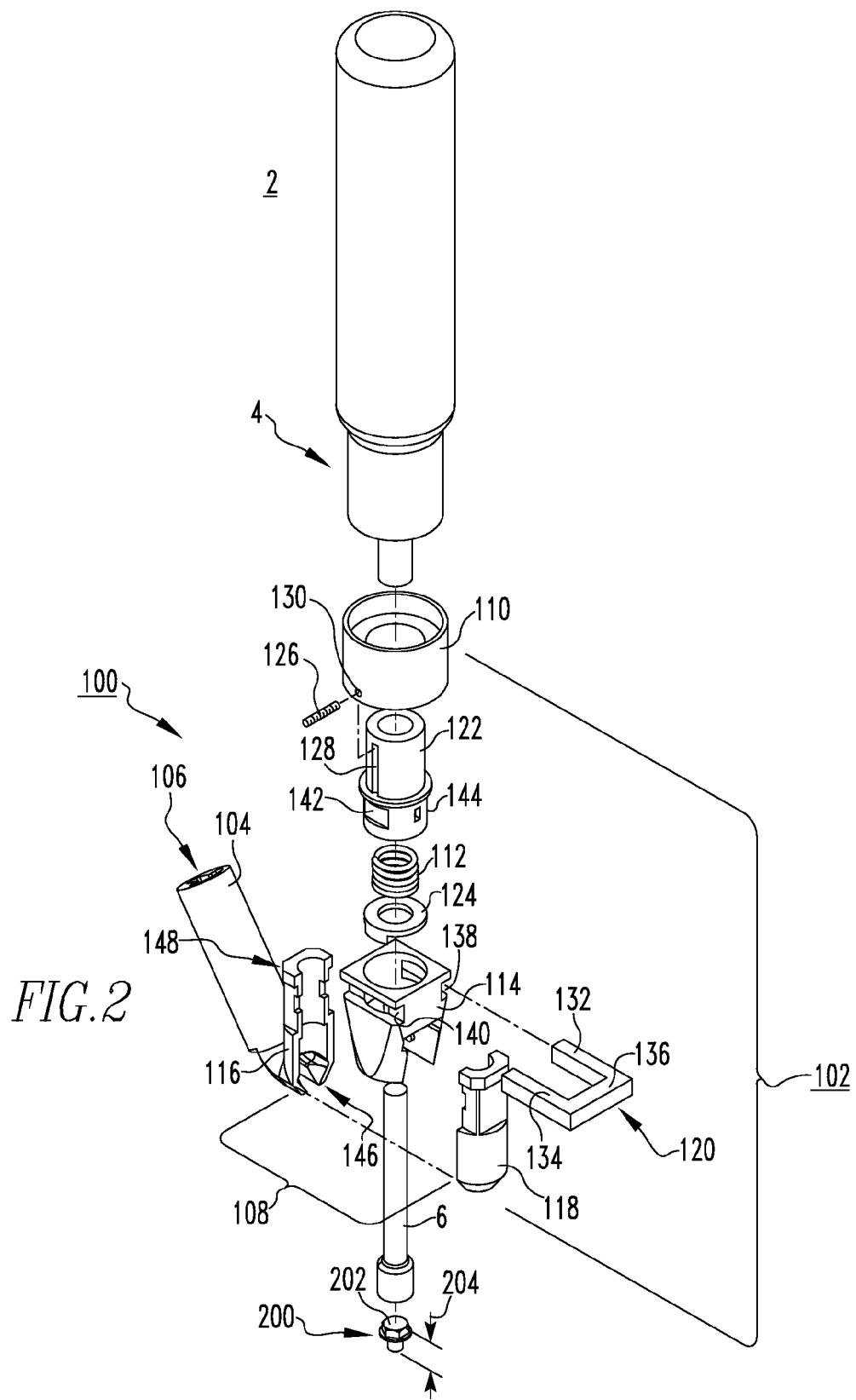
FIG. 2 is an isometric exploded view of the fastener tool and feeder assembly therefor of FIG. 1.
Figure 3:
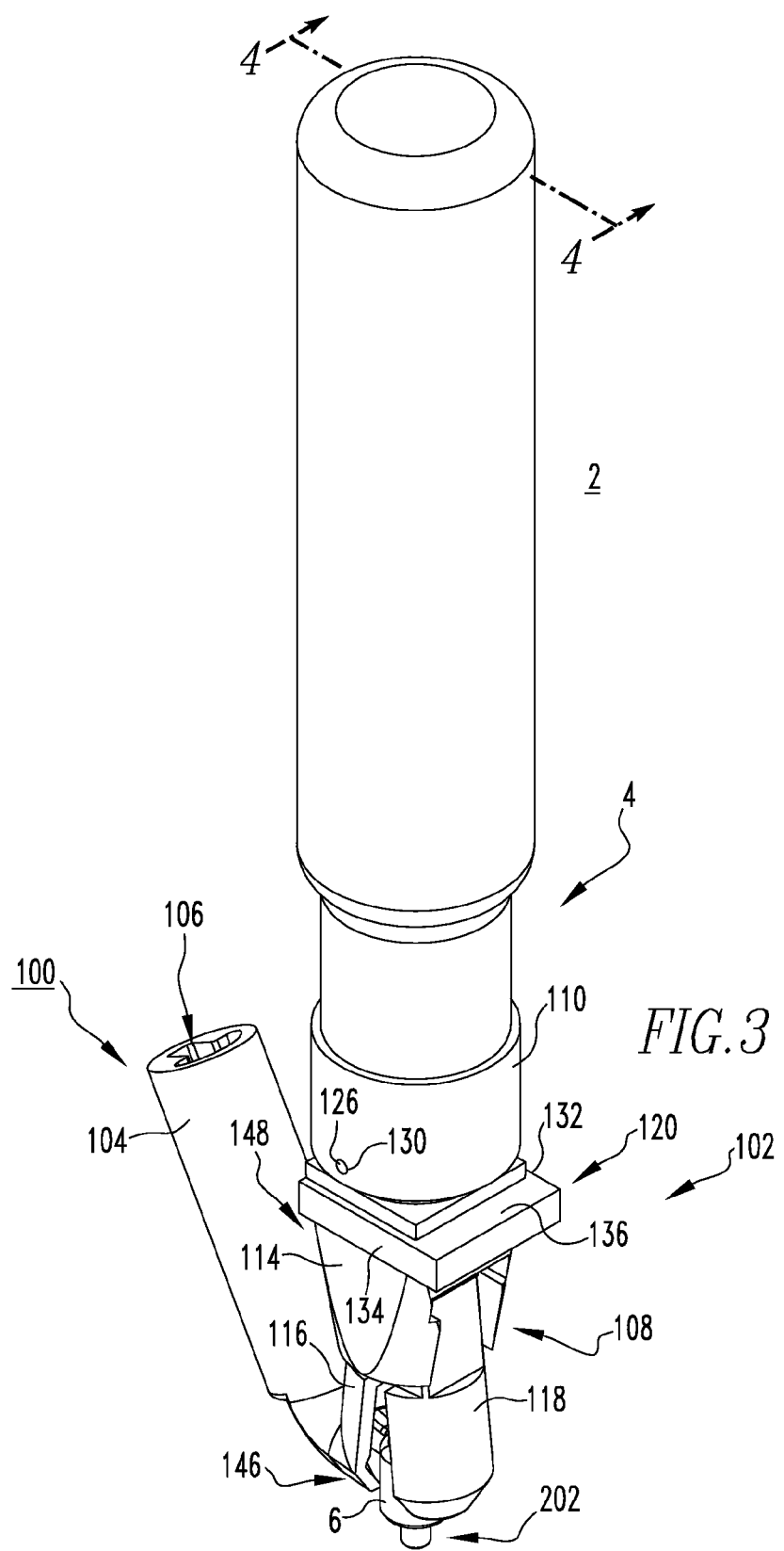
FIG. 3 is an assembled isometric view of the fastener tool and feeder assembly therefor of FIG. 2, shown in the position corresponding to a fastener being driven into a work piece.
Figure 4:
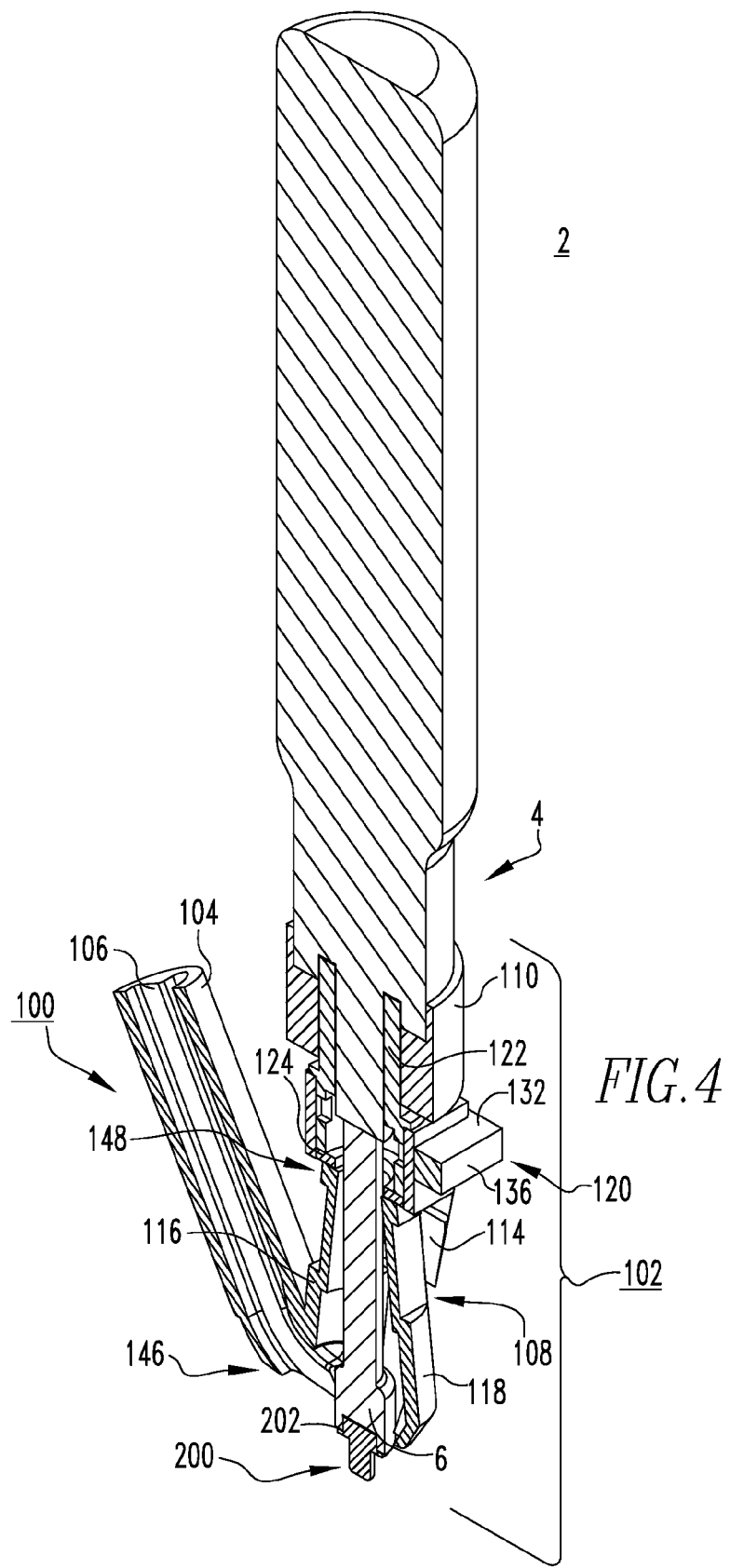
FIG. 4 is a section view taken along line 4-4 of FIG. 3.
Figure 5:
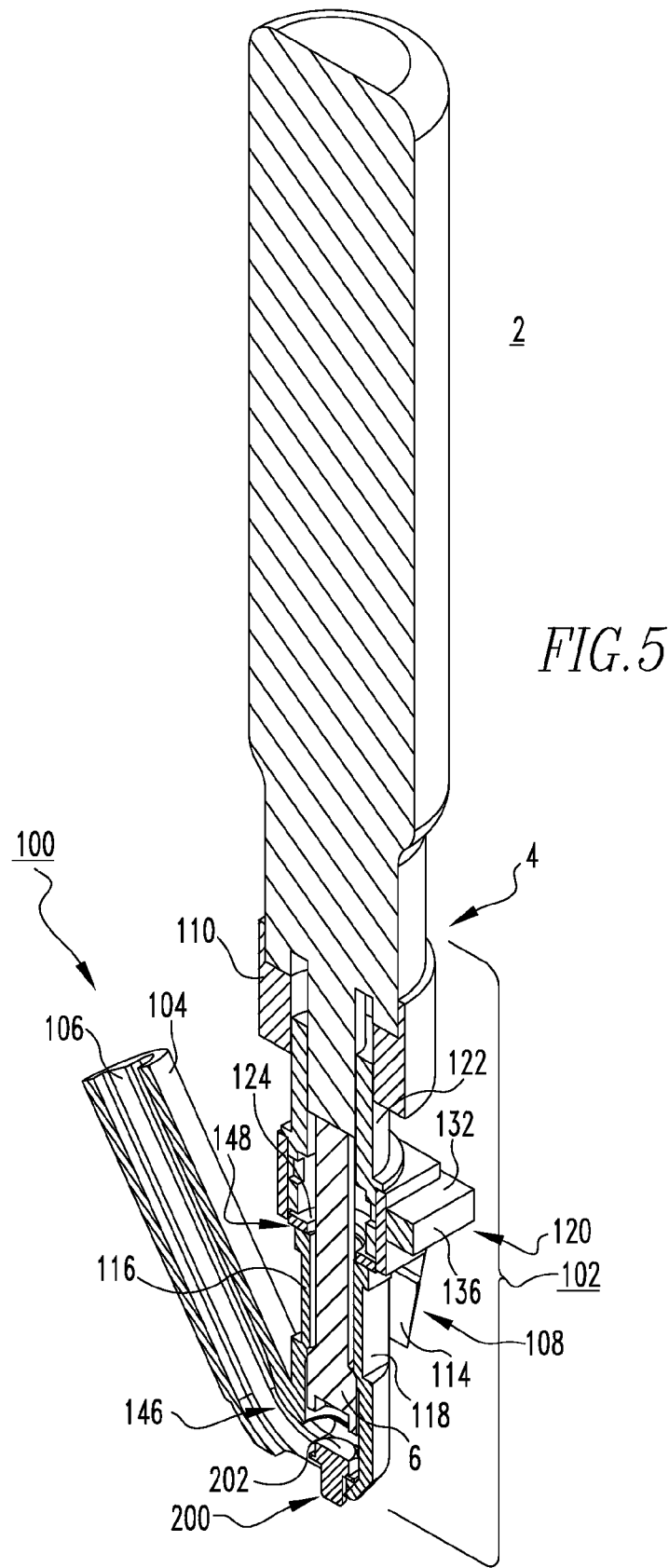
FIG. 5 is a section view similar to FIG. 4, but modified to show the fastener tool and feeder assembly therefor in the position prior to engaging the work piece and installing the fastener.

As best shown in the exploded view of FIG. 2, the nose assembly 102 preferably includes a jaw assembly 108, and an adapter 110 for coupling the jaw assembly 108 to the driver assembly 4. The jaw assembly 108 is movable between an open position (FIGS. 3 and 4) corresponding to the fastener tool 2 being actuated to install a corresponding one of the fasteners 200 in the work piece 300 (FIG. 1), and a closed position (FIGS. 1 and 5) corresponding to the jaw assembly 108 retaining a corresponding one of the fasteners 200 in the predetermined orientation, prior to the fastener tool 2 being actuated. A biasing element such as, for example and without limitation, the spring 112 shown in FIG. 2, biases the jaw assembly 108 toward the closed position. In the example shown and described herein, the jaw assembly 108 includes a jaw body 114 and opposing first and second jaws 116,118 pivotably coupled to the jaw body 114. When the jaw assembly 108 moves toward the open position, the first and second jaws 116,118 pivot outwardly away from each other, as shown in FIGS. 3 and 4. Conversely, when the jaw assembly 108 moves toward the closed position, the first and second jaws 116,118 move toward each other to secure a corresponding one of the fasteners 200 therebetween, as shown in FIGS. 1 and 5.

The example nose assembly 102 further includes a collar 120, a tube 122, and a washer 124. The washer 124 is disposed on a first end of the spring 112 and cooperates with the first and second jaws 116,118 to bias them towards the closed position (FIGS. 1 and 5), as previously discussed. The tube 122 is disposed on the opposite end of the spring 112, and at least partially extends into the jaw body 114, as best shown in the section views of FIGS. 4 and 5. The collar 120 couples the tube 122 to the jaw body 114. In the example shown and described herein, the collar 120 includes a pair of opposing legs 132,134 and an intermediate portion 136 extending therebetween. The jaw body 114 includes a pair of opposing channels 138,140, and the tube 122 includes a pair of opposing recesses 142,144. Accordingly, it will be appreciated that when the tube 122 is disposed within the jaw body 114 (best shown in the section views of FIGS. 4 and 5), the opposing recesses 142,144 align with the opposing channels 138,140 such that the opposing legs 132,134 of the collar 120 slide into, and are disposed in, the opposing channels 138,140 and opposing recesses 142,144, thereby securing the tube 122 within the jaw body 114.

The aforementioned adapter 110 suitably couples the remainder of the nose assembly 102 to the driver assembly 4 of the fastener tool 2. In the example of FIG. 2, the nose assembly 102 further includes a set screw 126 and the tube 122 includes a slot 128. The set screw 126 extends through a thru hole 130 in the adapter 110 and into the slot 128, in order to align the adapter 110 with the tube 122, as desired.

In addition to the foregoing, the jaw assembly 108 of the example nose assembly 102 also includes a number of additional unique features. Among them is the fact that the first jaw 116 has opposing first and second ends 146,148, wherein the conduit 104 is preferably attached to the first jaw 116 at or about the first end 146 such that the conduit 104 and first jaw 116 pivot together, as an assembly, as shown in FIGS. 3 and 4. As also shown in FIG. 4, the first jaw 116 preferably has an internal shape that is substantially the same as the predetermined shape of the passageway 106 of the conduit 104, and substantially the same as the predetermined shape of the fasteners 200. Additionally, at least a portion of the first jaw 116 is preferably magnetic or magnetized, in order to further facilitate the attraction and retention of the fastener 200 in the desired predetermined orientation within the nose assembly 102.

It will be appreciated that, in operation, a method of using the fastener tool involves the steps of providing the aforementioned feeder assembly 100, and coupling the nose assembly 102 to the driver assembly 4. The conduit 104 is coupled to the nose assembly 102. The fasteners 200 are then delivered to the nose assembly 102 in the desired predetermined orientation, by way of the conduit passageway 106, as previously discussed. Specifically, the fasteners 200 are aligned and transferred into the nose assembly 100 in a single file, one-by-one arrangement, as shown in hidden line drawing in FIG. 1. The nose assembly 102 and, in particular the jaw assembly 108 thereof, then retain a corresponding one of the fasteners 200 in such predetermined orientation below the driver bit 6, as best shown in FIG. 5. Next, the work piece 300 (FIG. 1) is engaged by the fastener tool 2 and, in particular, the fastener 200 protruding therefrom (see FIGS. 1 and 5) as well as the jaw assembly 108, thereby causing the driver bit 6 to move into engagement with the head 202 of the fastener 200, as best shown in FIG. 4. The jaws 116,118 of the jaw assembly 108 are then moved (e.g., upward from the perspective of FIGS. 3 and 4) causing the jaws 116,118 to spread outwardly apart and release the fastener 200, as shown in FIGS. 3 and 4, and the fastener 200 is installed, for example, in a corresponding hole 302 (FIG. 1) of the work piece 300 (FIG. 1). It will be appreciated that such movement of the jaw assembly 108 may also function to automatically actuate the driver assembly 4 of the fastener tool 2, for example, in order to begin turning the driver bit 6 to drive the fastener 200 into the work piece 300 (FIG. 1). After the fastener 200 has been installed, the fastener tool 2 is withdrawn from the work piece 300 (FIG. 1), causing the jaws 116,118 of the jaw assembly 108 to close. Another one of the fasteners 200 is then automatically fed through the conduit 104 into the nose assembly 102 and retained in the predetermined orientation therein, below the driver bit 6 and ready to be installed in the work piece 300 (FIG. 1) in the aforementioned manner.

Accordingly, it will be appreciated that the disclosed fastener tool 2, feeder assembly 100 and method provide a portable mechanism and process for automatically feeding and installing a wide variety of different fastener shapes, sizes and/or types in any known or suitable work piece (see, for example and without limitation, work piece 300 of FIG. 1), and while employing the fastener tool 2 in any desired orientation.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A feeder assembly for a fastener tool structured to install a number of fasteners in a work piece, said fastener tool including a driver assembly having a driver bit, said fasteners having a predetermined shape, said feeder assembly comprising:
   a nose assembly structured to be operatively coupled to said driver assembly, said nose assembly being structured to receive said fasteners and retain said fasteners in a predetermined orientation below said driver bit; and
   a conduit coupled to said nose assembly, said conduit including a passageway structured to align and deliver said fasteners to said nose assembly in said predetermined orientation,
   wherein said nose assembly comprises a jaw assembly, an adapter, and a biasing element; wherein said adapter is structured to couple said jaw assembly to said driver assembly,
   wherein said jaw assembly comprises a jaw body, a first jaw pivotably coupled to said jaw body, and a second jaw pivotably coupled to said jaw body opposite said first jaw, and
   wherein said nose assembly further comprises a collar, a tube, and a washer; wherein said biasing element is a spring; wherein said washer is structured to cooperate with said first jaw and said second jaw; wherein said spring is disposed between said washer and said tube; wherein said tube is at least partially disposed within said jaw body; and wherein said collar couples said tube to said jaw body.

2. The feeder assembly of claim 1 wherein said passageway of said conduit has a predetermined shape; and wherein said predetermined shape of said passageway is structured to be substantially similar to said predetermined shape of said fasteners.

3. The feeder assembly of claim 1 wherein said jaw assembly is structured to move between an open position corresponding to said fastener tool being actuated to install a corresponding one of said fasteners in said work piece, and a closed position corresponding to said jaw assembly retaining a corresponding one of said fasteners in said predetermined orientation prior to said fastener tool being actuated.

4. The feeder assembly of claim 3 wherein, when said jaw assembly moves toward said open position, said first jaw and said second jaw pivot outwardly away from each other; and wherein, when said jaw assembly moves toward said closed position, said first jaw and said second jaw are structured to move toward each other to secure said corresponding one of said fasteners therebetween.

5. The feeder assembly of claim 1 wherein said nose assembly further comprises a set screw; wherein said tube includes a slot; wherein said adapter includes a thru hole; wherein said adapter is disposed over said tube; and wherein said set screw extends through said thru hole into said slot in order to align said adapter with said tube.

6. The feeder assembly of claim 1 wherein said collar includes a pair of opposing legs and an intermediate portion extending therebetween; wherein said jaw body includes a pair of opposing channels; wherein said tube includes a pair of opposing recesses; wherein, when said tube is disposed within said jaw body, said pair of opposing recesses align with said pair of opposing channels; and wherein said pair of opposing legs of said collar are disposed in said pair of opposing channels and said pair of opposing recesses, thereby securing said tube within said jaw body.

7. The feeder assembly of claim 1 wherein said first jaw has a first end and a second end; wherein said conduit is a hose; wherein said hose attaches to said first jaw at or about the first end of said first jaw; and wherein the first end of said first jaw has an internal shape that is substantially the same as the predetermined shape of said hose.

8. The feeder assembly of claim 1 wherein at least a portion of said first jaw is structured to be magnetic.

9. A fastener tool structured to install a number of fasteners in a work piece, said fasteners having a predetermined shape, said fastener tool comprising:
   a driver assembly having a driver bit; and
   a feeder assembly comprising:
      a nose assembly operatively coupled to said driver assembly, said nose assembly being structured to receive said fasteners and retain said fasteners in a predetermined orientation below said driver bit, and
      a conduit coupled to said nose assembly, said conduit including a passageway structured to align and deliver said fasteners to said nose assembly in said predetermined orientation,
   wherein said nose assembly comprises a jaw assembly, an adapter, and a biasing element; wherein said adapter couples said jaw assembly to said driver assembly,
   wherein said jaw assembly comprises a jaw body, a first jaw pivotably coupled to said jaw body, and a second jaw pivotably coupled to said jaw body opposite said first jaw, and
   wherein said nose assembly further comprises a collar, a tube, and a washer; wherein said biasing element is a spring; wherein said washer cooperates with said first jaw and said second jaw; wherein said spring is disposed between said washer and said tube; wherein said tube is at least partially disposed within said jaw body; and wherein said collar couples said tube to said jaw body.

10. The fastener tool of claim 9 wherein said passageway of said conduit has a predetermined shape; and wherein said predetermined shape of said passageway is substantially similar to said predetermined shape of said fasteners.

11. The fastener tool of claim 9 wherein said jaw assembly moves between an open position corresponding to said fastener tool being actuated to install a corresponding one of said fasteners in said work piece, and a closed position corresponding to said jaw assembly retaining a corresponding one of said fasteners in said predetermined orientation prior to said fastener tool being actuated.

12. The fastener tool of claim 9 wherein, when said jaw assembly moves toward said open position, said first jaw and said second jaw pivot outwardly away from each other; and wherein, when said jaw assembly moves toward said closed position, said first jaw and said second jaw move toward each other to secure said corresponding one of said fasteners therebetween.

13. The fastener tool of claim 9 wherein said nose assembly further comprises a set screw; wherein said tube includes a slot; wherein said adapter includes a thru hole; wherein said adapter is disposed over said tube; and wherein said set screw extends through said thru hole into said slot in order to align said adapter with said tube.

14. The fastener tool of claim 9 wherein said collar includes a pair of opposing legs and an intermediate portion extending therebetween; wherein said jaw body includes a pair of opposing channels; wherein said tube includes a pair of opposing recesses; wherein, when said tube is disposed within said jaw body, said pair of opposing recesses align with said pair of opposing channels; and wherein said pair of opposing legs of said collar are disposed in said pair of opposing channels and said pair of opposing recesses, thereby securing said tube within said jaw body.

15. The fastener tool of claim 9 wherein said first jaw has a first end and a second end; wherein said conduit is a hose; wherein said hose attaches to said first jaw at or about the first end of said first jaw; and wherein the first end of said first jaw has an internal shape that is substantially the same as the predetermined shape of said hose.

16. The fastener tool of claim 9 wherein at least a portion of said first jaw is magnetic.

* * * * *